United States Patent
Mery et al.

[11] Patent Number: 5,551,537
[45] Date of Patent: Sep. 3, 1996

[54] DISK BRAKE USING A PULLED PAD WITH SLIDING BEARING

[75] Inventors: Jean Claude Mery, Pavillons-Sous-Bois; Jean Charles Maligne, Aubervilliers, both of France

[73] Assignee: AlliedSignal Europe Services Techniques, Drancy, France

[21] Appl. No.: 204,248

[22] PCT Filed: Feb. 17, 1994

[86] PCT No.: PCT/FR94/00174

§ 371 Date: Mar. 7, 1994

§ 102(e) Date: Mar. 7, 1994

[87] PCT Pub. No.: WO94/24452

PCT Pub. Date: Oct. 27, 1994

[30] Foreign Application Priority Data

Apr. 15, 1993 [FR] France .................................. 93 04392

[51] Int. Cl.[6] ................................................ F16D 55/226
[52] U.S. Cl. .................. 188/73.39; 188/73.1; 188/73.35; 188/73.36; 188/73.43
[58] Field of Search .............................. 188/73.39, 73.31, 188/73.43, 73.35, 73.36, 73.1, 73, 38, 250 G, 250 B

[56] References Cited

U.S. PATENT DOCUMENTS

| | | | |
|---|---|---|---|
| 4,044,864 | 8/1977 | Karasudani | 188/73.39 |
| 4,219,106 | 8/1980 | Lüpertz et al. | 188/73.39 |
| 4,335,806 | 6/1982 | Lüpertz | 188/73.39 |
| 4,527,667 | 7/1985 | Courbot | 188/73.36 |
| 4,993,519 | 2/1991 | Thioux | 188/73.39 |
| 5,111,914 | 5/1992 | Thiel et al. | 188/73.39 |
| 5,113,978 | 5/1992 | Weiler et al. | 188/73.31 |
| 5,297,659 | 3/1994 | Thiel et al. | 188/73.31 |

FOREIGN PATENT DOCUMENTS

| | | |
|---|---|---|
| 0002399 | 9/1981 | European Pat. Off. . |
| 0357469 | 3/1990 | European Pat. Off. . |
| 1526258 | 9/1978 | United Kingdom . |
| 2030666 | 4/1980 | United Kingdom . |

*Primary Examiner*—Douglas C. Butler
*Attorney, Agent, or Firm*—Leo H. McCormick, Jr.

[57] ABSTRACT

A sliding caliper disk brake having first and second pads with a body having first and second lateral ends. One of the first and second lateral ends tractionally engages by a yoke while the other lateral end bears against the yoke. The first and second lateral ends have a rounded profile to optimize the transmission of drive loads into the yoke during a braking application such the braking forces are balanced between the first and second lateral ends.

7 Claims, 4 Drawing Sheets

DISK BRAKE USING A PULLED PAD WITH SLIDING BEARING

The present invention relates to a disk brake for a motor vehicle, comprising a first support which is fixed with respect to the vehicle, a second support shaped into a caliper and slidably mounted with respect to the first one, pads each of which is held by one of the supports so as to resist the drive forces to which it is subjected in the event of braking, and a brake motor associated with the second support and capable of being actuated so as to give rise to the application of said pads onto the disk according to a movement which is substantially perpendicular to the latter, each pad having a central friction zone and two lateral ends, the first of which is offset with respect to the central zone in the direction of rotation of the disk and at least the second of which has a drive profile, the support of this pad having a retaining profile interacting with this drive profile in order to retain this pad when it is stressed in the direction of rotation of the disk by the drive forces, and at least the first end of each pad having an external contact surface suitable for abutting against a corresponding internal contact surface of a first bearing surface provided on the support for this pad.

Disk brakes of this type have been known for a long time in the prior art, and an example thereof is given in U.S. Pat. No. 4,044,864.

From a theoretical point of view, these brakes a priori have the advantage of allowing the pad, on which the driving loads are applied in the event of braking, to transmit these loads to the support which holds it in place, that is to say generally to the first support called a "carrier", through each of the ends of this pad, one of which thus works in traction, and the other in bearing.

From an actual point of view, the situation is, however, very different and much less advantageous, the simultaneous nature of the traction and thrust loads practically never being obtained.

Indeed, in known brakes of the aforementioned type, the distribution of the traction and thrust loads depends extremely critically both on the dimensions of the pad and of the support which receives it, these dimensions themselves being subjected not only to manufacturing tolerances but also to variable deformations of the brake under the effect of more or less intense braking loads, and/or more or less significant temperature rises.

In this context, the object of the invention is to propose a sliding-caliper disk brake in which the transmission to the pad support of the loads received by the latter may be produced at both ends of the pad without being subjected, in a hindering fashion, to the influence of undesirable parameters such as those which have just been expounded.

To this end, the disk brake of the invention is essentially characterized in that one of the two contact surfaces which are face to face is concave and the other convex, in that the convex contact surface has a rounded profile, in that the concave contact surface points in a direction which is substantially perpendicular to a radius of the disk passing through the central zone of this pad and has at least two tangents which are oblique with respect to the direction in which this concave surface points, and between them forming a non-zero angle, in that a radial clearance and a tangential clearance separate the concave and convex contact surfaces in the absence of said drive forces, and in that each pad is stressed with respect to its support by an elastic force having at least a first component pointing along the radius of the disk which passes through the central zone of this pad and a second component perpendicular to the radius of the disk passing through the central zone of the pad and pointing in the direction of rotation of the disk, from which it results that the contact surfaces bear one against the other with a non-zero bearing force, even in the absence of actuation of the brake.

Although the use of concave and convex contact surfaces is described in Patents EP-B-O,002,399 and EP-A-357,469, each of these prior documents describes a brake in which the pad bears exclusively on just one branch of the carrier, the latter therefore, according to the teachings of these prior documents, having to be sized so as to be able to absorb the whole of the braking torque.

According to a simple embodiment of the invention, the two contact surfaces have a rounded profile, each concave contact surface having a radius of curvature which is greater than the radius of curvature of the corresponding convex surface.

For example, the drive profile may comprise a slot provided on the pad and open towards the inside of the disk.

The external contact surface provided on the pad may be convex or concave, and the first component of the elastic force may be centrifugal or centripetal.

Moreover, the elastic force preferably has a second component perpendicular to the radius of the disk passing through the central zone of the pad and pointing in the direction of rotation of the disk.

In the case where it is desirable for the vehicle to be able to be braked with great effectiveness not only when running forwards, but also when in reverse, each pad includes an external contact surface and a drive profile at each of its ends.

Other features and advantages of the invention will emerge clearly from the description which is given hereafter by way of non-limiting example and with reference to the appended drawings in which.

Figure 1:
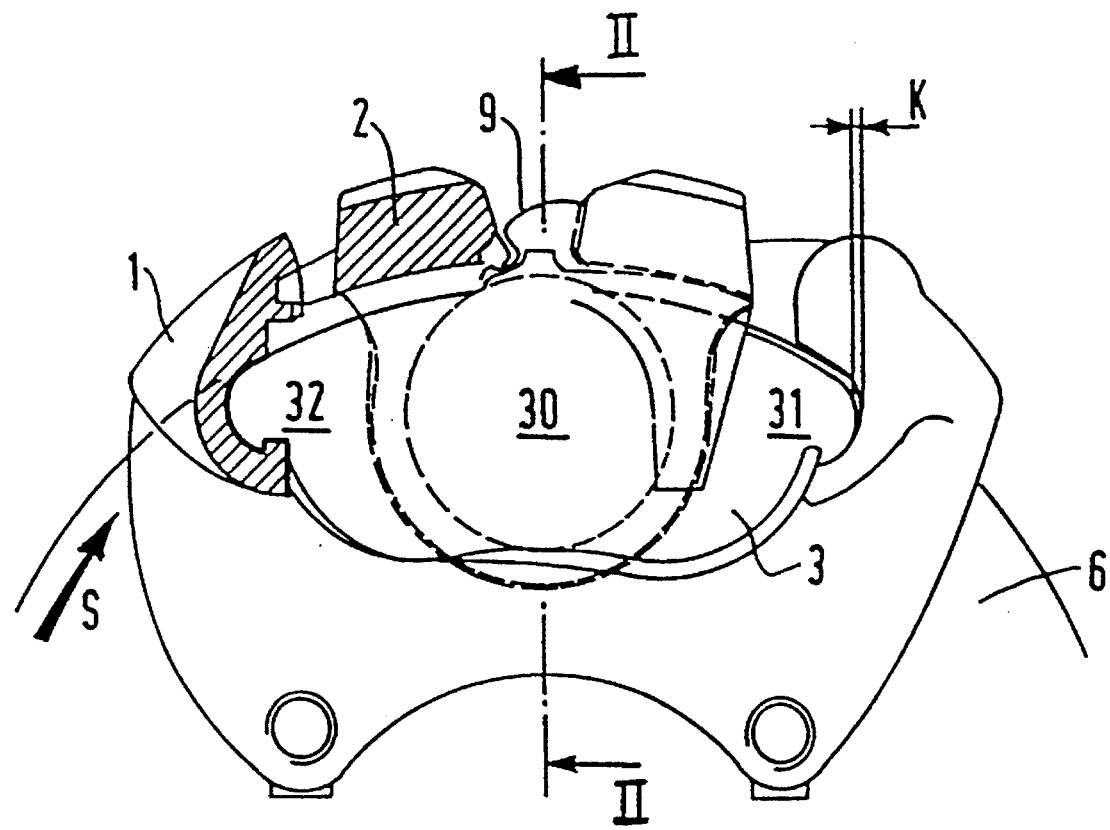
FIG. 1 is a partial sectional view of a disk brake in accordance with the invention.
Figure 2:
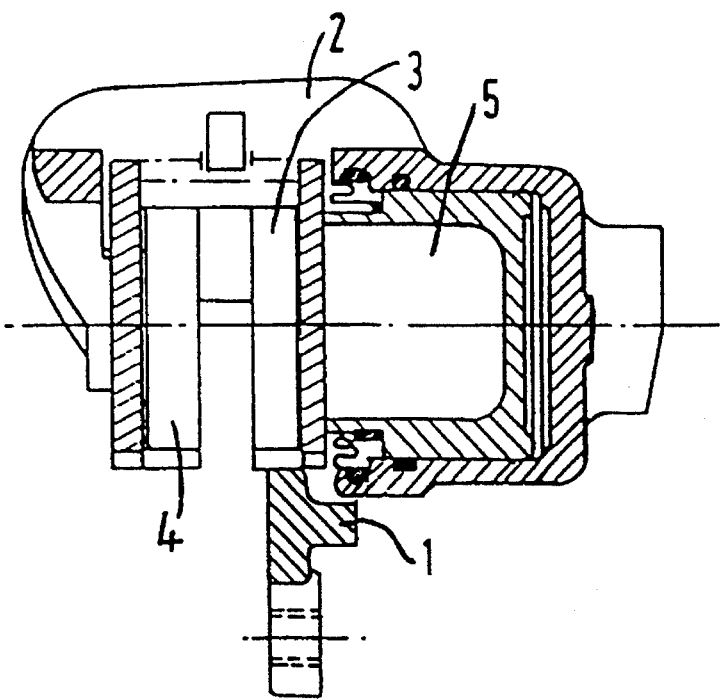
FIG. 2 is a sectional view of the disk brake of FIG. 1 taken along the line II—II of this figure.

The invention generally relates to sliding-caliper disk brakes intended to equip motor vehicles.

Such brakes comprise a first support 1, called a "yoke", fixed with respect to the vehicle, a second support 2 shaped into a caliper and slidably mounted with respect to the first one, pads 3, 4 each of which is held by one of the supports, generally by the yoke 1, so as to resist the drive forces to which it is subjected in the event of braking, and a brake motor 5 associated with the second support 2, and capable of being actuated so as to give rise to the application of the pads 3, 4 onto the disk 6 according to a movement which is substantially perpendicular to the latter.

Each pad 3, 4 conventionally has a central friction zone such as 30 and two lateral ends 31, 32, the first 31 of which is offset with respect to the central zone 30 in the direction of rotation S of the disk 6 and at least the second 32 of which has a drive profile 32a.

On its side, the support for this pad, for example the yoke 1, has a retaining profile 7a interacting with the drive profile 32a of the pad 3, in order to retain the latter when it is stressed in the direction of rotation S of the disk 6 by the drive forces.

Moreover, at least the first end 31 of each pad such as 3 has an external contact surface 31b suitable for abutting against a corresponding internal contact surface 8b of a first bearing surface 8 provided on the support 1 for this pad.

According to the invention, one of the two contact surfaces 31b, 8b is concave and the other is convex, the convex contact surface having a rounded profile.

The concave contact surface points in a direction substantially perpendicular to a radius R of the disk 6 passing through the central zone 30 of this pad, namely the direction of the straight line X, and has at least two tangents T1 and T2 which are oblique with respect to the direction of this straight line X and between them forming a non-zero angle G.

By convention, the word "oblique" is understood here to apply to two directions which between them make an angle which is non-zero and is different both from a flat angle and from a right angle.

A radial clearance J (FIG. 3) and a tangential clearance K (FIG. 1) separate the concave and convex contact surfaces 31b, 8b in the absence of drive forces, that is to say in the state of rest of the brake or in the absence of rotation of the disk, and each pad, such as 30, is stressed with respect to its support 1 by an elastic force F exerted by a spring 9 and having at least a first component F1 pointing along the radius R of the disk 6 which passes through the central zone 30 of this pad.

By virtue of these features, the contact surfaces 31b, 8b bear one against the other with a non-zero bearing force, even in the absence of actuation of the brake and despite the presence of the necessary clearances.

The concave surface may adopt a regular polygon shape and even possibly the shape of a reentrant dihedron.

However, the two contact surfaces 31b, 8b preferably have a rounded profile as shown in FIGS. 1 and 3 to 6, each concave contact surface having a radius of curvature which is greater than the radius of curvature of the corresponding convex surface.

Figure 3:
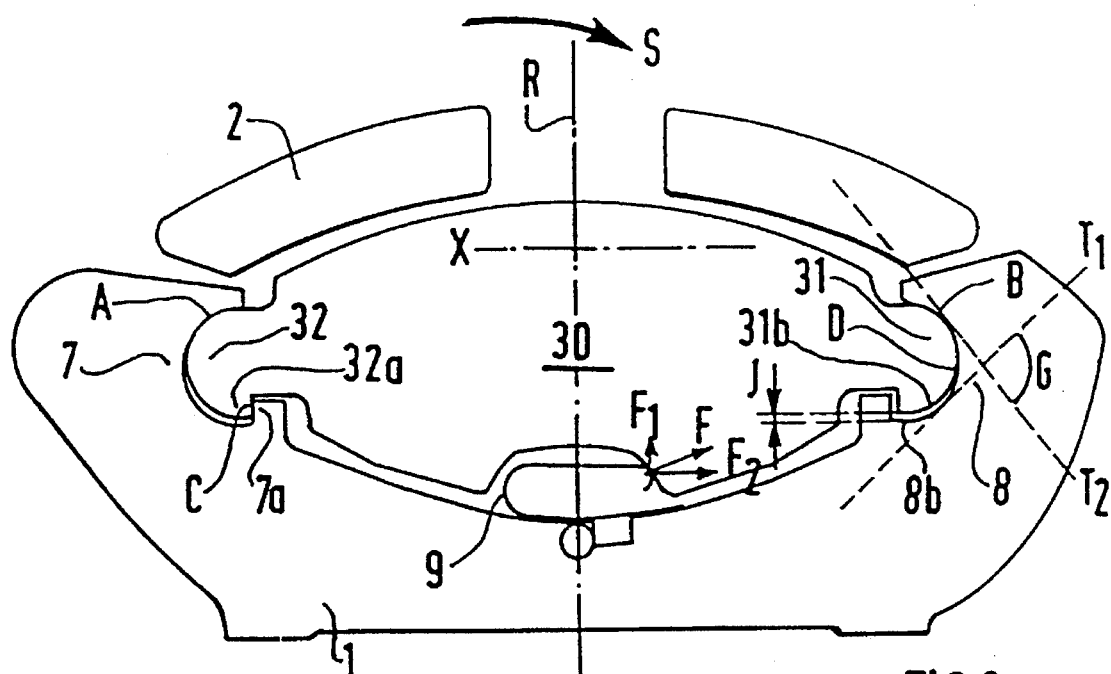
FIG. 3 is a diagrammatic view illustrating the principle of the invention in a disk brake in accordance with a first embodiment.
Figure 4:
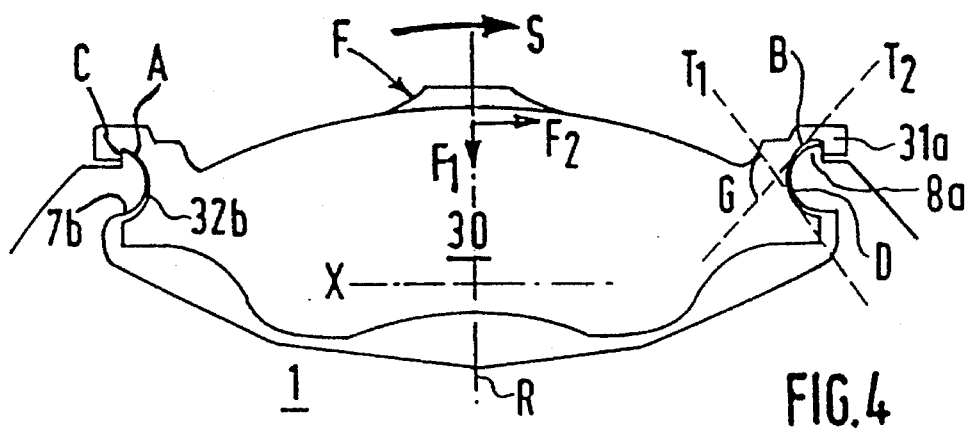
FIG. 4 is a diagrammatic view illustrating the principle of the invention in a disk brake in accordance with a second embodiment.
Figure 5:
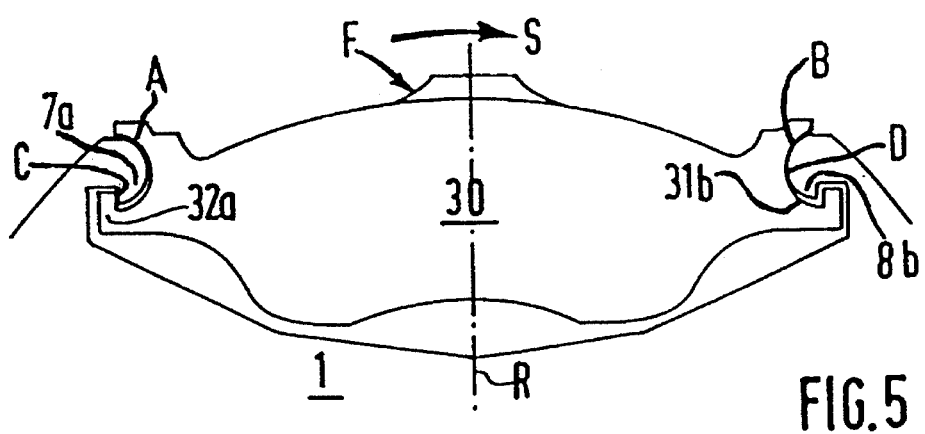
FIG. 5 is a diagrammatic view illustrating the principle of the invention in a disk brake in accordance with a third embodiment.

The drive profile 32a provided on the pad may assume the form of a slot which is open towards the inside of the disk as shown in FIGS. 3 and 4, or a slot which is open towards the outside of the disk as shown in FIG. 5.

The external contact surface 31b of the pad may be the convex surface (FIGS. 3 and 6), or it may constitute the concave contact surface (FIGS. 4 and 5). Moreover, the first component F1 of the elastic force is preferably centrifugal, that is to say pointed towards the outside of the disk 6, but may also be centripedal, that is to say pointing towards the inside of the disk 6.

In all cases, it is desirable for the elastic force F exerted by the spring 9 to have a second component F2 which is perpendicular to the radius R of the disk 6 which passes through the central zone 30 of the pad and points in the direction of rotation S of the disk.

Figure 6:
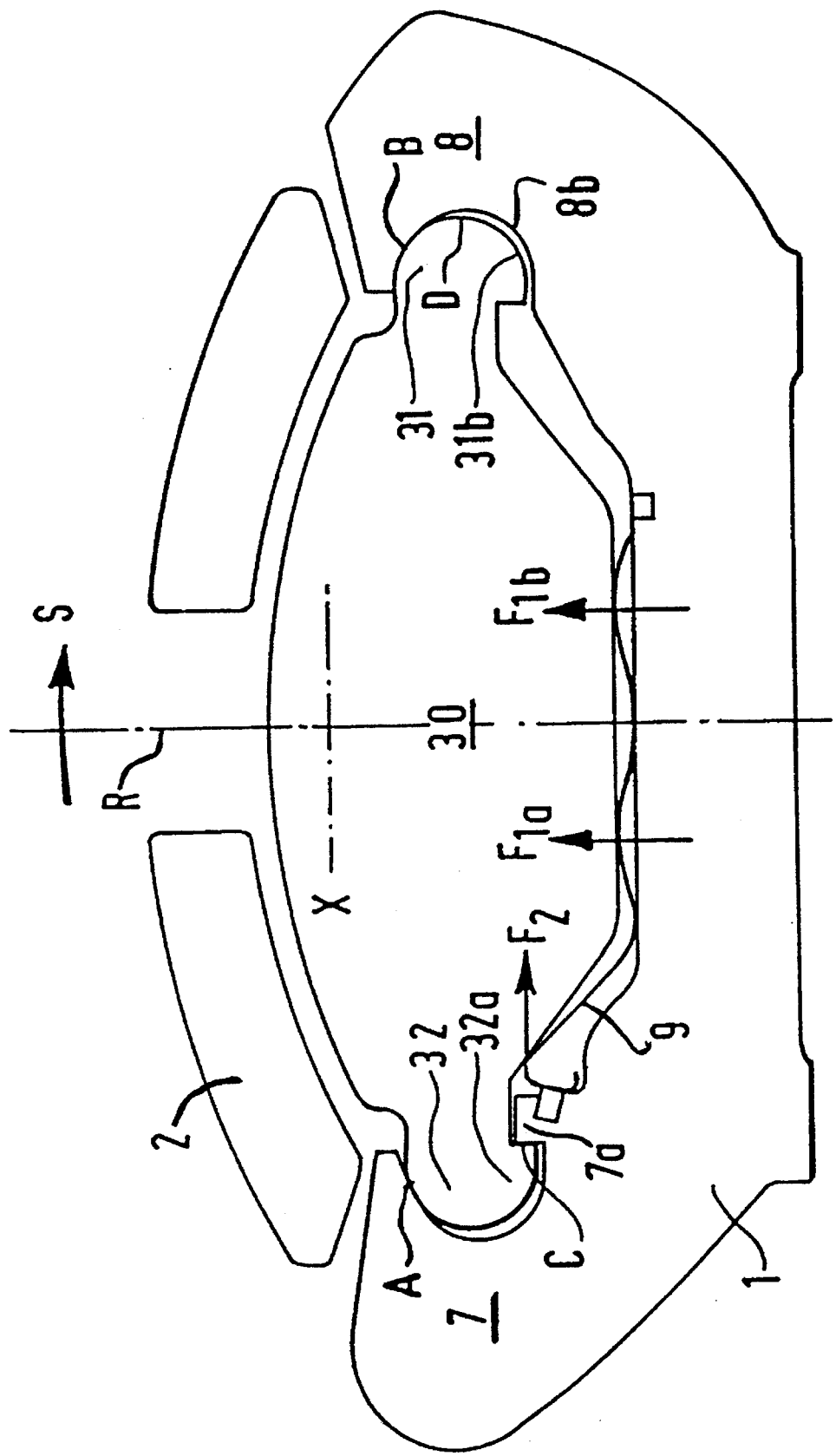
FIG. 6 represents a variant of the brake illustrated in FIG. 3.

The spring 9, which is located between the pad 3 and its support 1 (FIGS. 1, 3 and 6), may exert distributed loads, as shown in FIG. 6 which represents an embodiment in which the components F1 and F2 of the elastic force F are exerted separately, the first component F1 itself consisting of two sub-components F1a and F1b.

Figure 7:
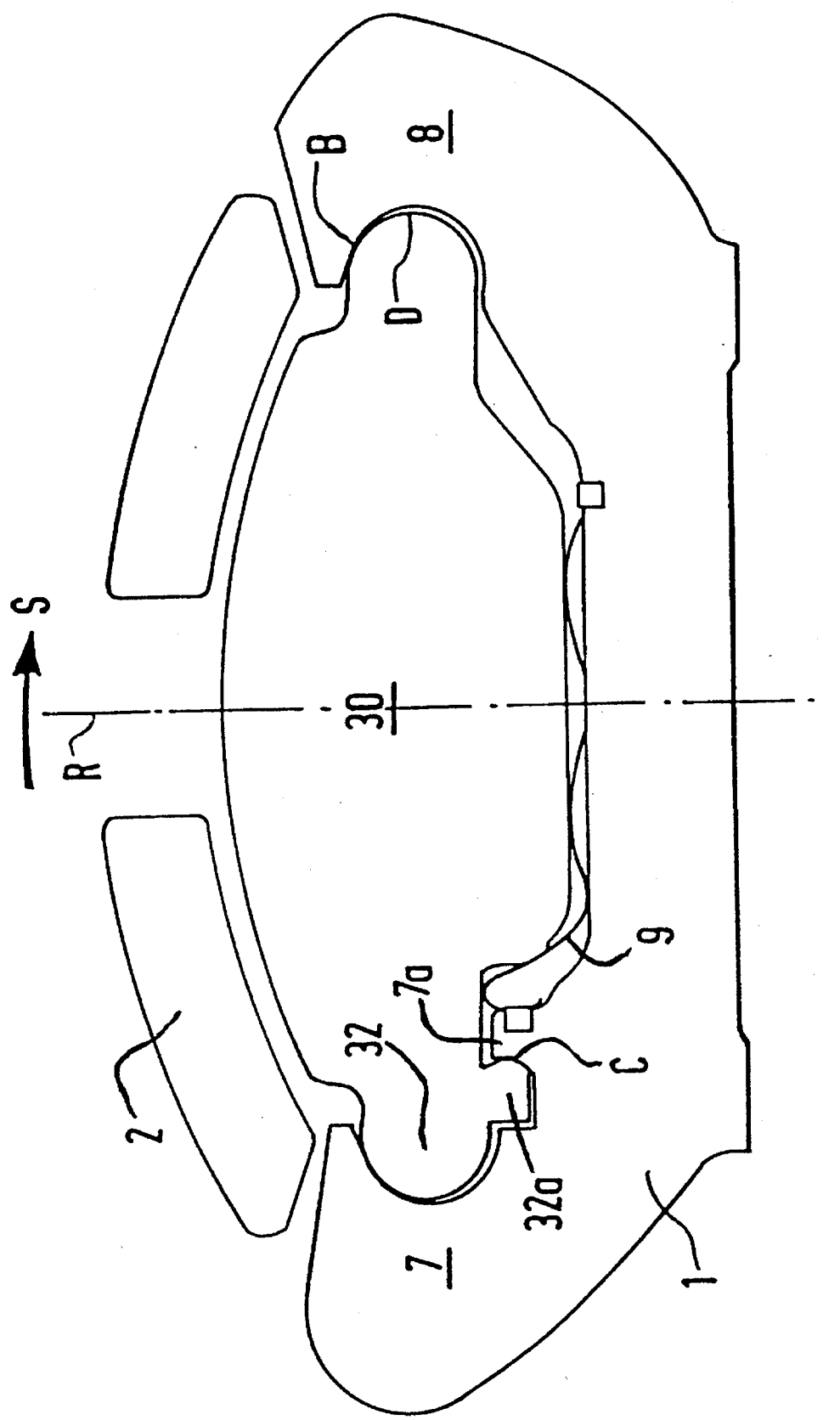
FIG. 7 represents another variant of the brake illustrated in FIG. 3.

As shown in FIG. 7, the drive profile 32a of the pad and the retaining profile 7a of its support may have opposite faces of rounded and complementary shapes in order to decrease the local stresses.

Finally, as shown in FIGS. 3 to 5, each pad may include an external contact surface 31b, 32b and a drive profile 31a, 32a at each of its two ends 31 and 32, interacting with the internal surfaces 8b, 7b and the retaining profiles 8a, 7a of respective bearing surfaces 8, 7.

By virtue of these characteristics, the pad 30 [sic] and its support 1 (FIGS. 3 to 6) are in contact with one another via the points A, B and C in the state of rest of the brake, and via the points C and D in the event of braking of the vehicle which is sufficiently intense to give rise to a maximum deformation of the brake, the second end 32 of the pad 3 always being fastened to the point C, and the first end of this pad under all circumstances bearing on the support 1 at the point B, at the point D, or if not at an intermediate point between the points B and D whose position depends on the functional clearances J and K, but whose existence is not conditioned by the manufacturing parameters (tolerances) or use parameters (thermal expansions, deformations) to which these clearances are subjected.

We claim:

1. A disk brake for a motor vehicle, comprising: a first support fixed with respect to the vehicle, a second support shaped into a caliper and slidably mounted with respect to said first support, first and second pads each of which is held by one of said supports to resist any drive forces developed during a brake application, and a brake motor associated with said second support and capable of being actuated to move said pads into engagement with a rotor to effect said brake application, said movement of said first and second pads being in a direction substantially perpendicular to a plane of rotation of said rotor, each pad having a body with a central friction zone and first and second lateral ends, said first lateral end being offset with respect to said central zone in the direction of rotation of said rotor and at least said second lateral end having a drive profile, said support for each pad having a retaining profile which interacts with said drive profile to retain each pad when said pad is stressed in the direction of rotation of said rotor by said drive forces, and at least said first end of each pad having an external contact surface suitable which abuts against a corresponding internal contact surface of a first bearing surface provided on said support for each pad, characterized in that one of said external and internal contact surfaces has a concave shape and the other of said external and internal contact surfaces has a convex shape, said convex contact surface having a rounded profile and said concave contact surface points in a direction which is substantially perpendicular to a radius of said rotor and passes through said central zone of each said pad, said concave contact surface having at least two tangents which are oblique with respect to the direction in which said concave surface points to form a non-zero angle therebetween, said concave and convex contact surfaces in the absence of said drive forces being separated by a radial clearance and a tangential clearance, said body of each said pad being stressed with respect to said support by an elastic force, said elastic force having at least a first component pointing along the radius of said rotor which passes through the central zone of said pad and a second component perpendicular to the radius of said rotor which passes through said central zone of said pad and pointing in the direction of rotation of said rotor such that said contact surfaces engage each other with a non-zero bearing force in the absence of actuation of said brake motor both by mutual contact of said contact surfaces and by mutual contact of said retaining and drive profiles to balance said drive force developed therebetween during a brake application.

2. The disk brake according to claim 1, characterized in that said external and internal contact surfaces have a rounded profile, and each concave contact surface has a radius of curvature which is greater than the radius of curvature of a corresponding convex surface.

3. The disk brake according to claim 1, characterized in that said drive profile comprises a slot provided on said pad and open towards the inside of said rotor.

4. The disk brake according to claim 1, characterized in that said contact surface provided on said pad is convex.

5. The disk brake according to claim 1, characterized in that said first component of said elastic force is centrifugal.

6. The disk brake according to claim 1, characterized in that each of said pads includes an external contact surface and a drive profile on each of said first and second ends.

7. The disk brake according to claim 1, characterized in that each of said drive profiles and each corresponding retaining profile have opposing faces of rounded and complementary shapes.

* * * * *